United States Patent Office 3,041,114
Patented June 26, 1962

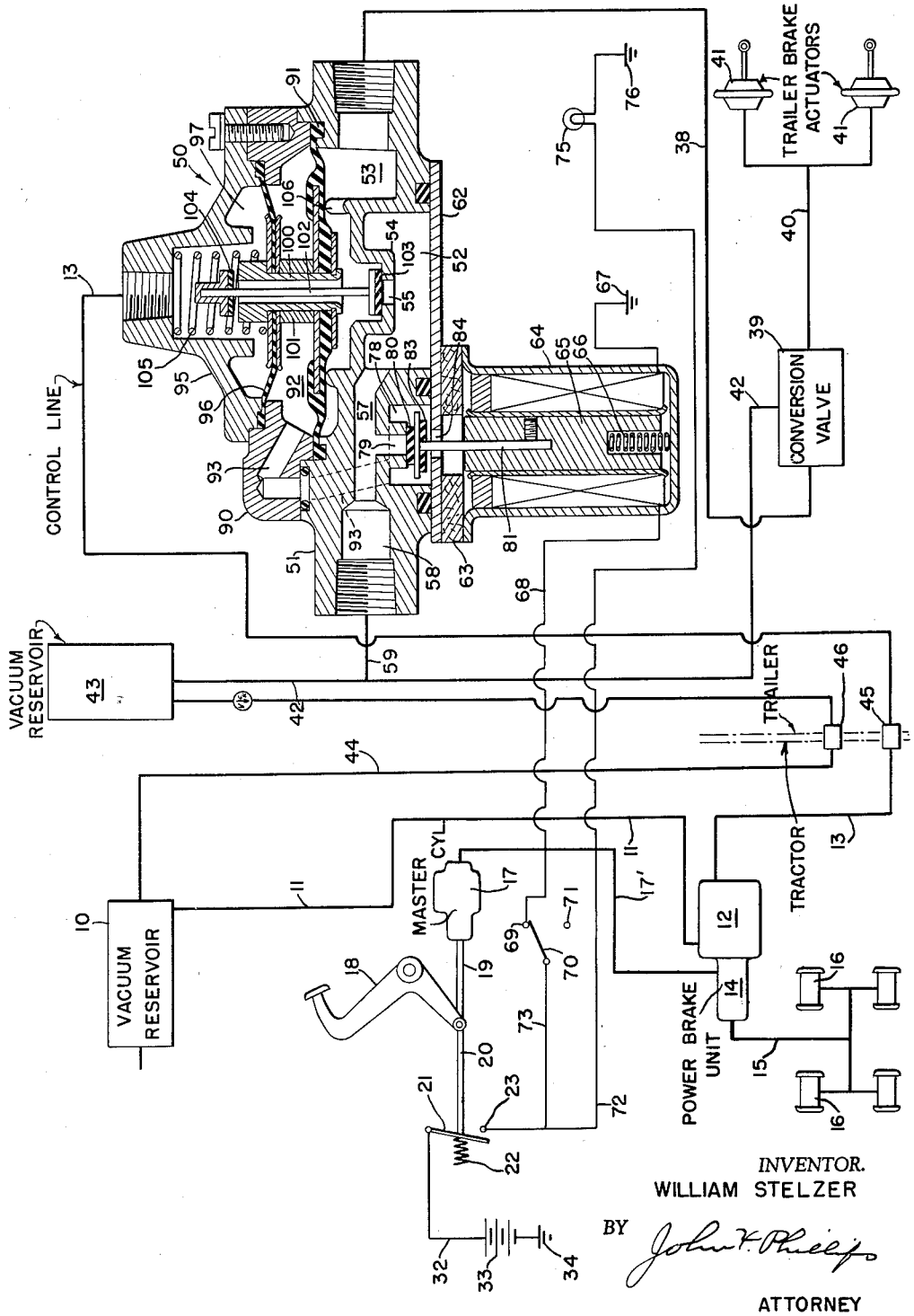

3,041,114
TRACTOR-TRAILER BRAKE SYSTEM
William Stelzer, Bloomfield Hills, Mich., assignor to Kelsey-Hayes Company, Detroit, Mich., a corporation of Delaware
Filed Aug. 8, 1958, Ser. No. 753,955
16 Claims. (Cl. 303—7)

This invention relates to a tractor-trailer brake system, and more particularly to a system of the vacuum operated type having means for varying the degree of application of the trailer brakes in accordance with the load being hauled.

In all tractor-trailer brake systems, it is a common practice to provide means for effecting the operation of the trailer brake actuators to a degree proportionate to the application of the tractor brake actuators, and this proportionate application of the two sets of brakes remains the same regardless of the loading of the trailer. Since adequate trailer braking must be provided, the systems of the character referred to function to provide maximum braking for heavy trailer loads, which braking is entirely too heavy when running light or relatively lightly loaded.

An important object of the present invention is to provide a novel valve mechanism, subject to control by the operator of the tractor, to furnish relatively heavy trailer brake actuation in a vacuum operated system when the trailer is relatively heavily loaded, or to provide for proportionate but lighter trailer brake actuation when the trailer is running unloaded or lightly loaded.

A further object is to provide a valve mechanism of the character referred to which is interposed in the conventional control line between the tractor and the usual conversion valve, and which valve mechanism is inoperative when the trailer is relatively heavily loaded to provide relatively heavy trailer brake application, and which is subject to control to provide a lesser degree of trailer brake application under light load conditions.

A further object is to provide such a system wherein the auxiliary valve mechanism is provided with ports, passages, etc., in series with the conventional control line to provide direct operation of the conversion valve on the trailer in accordance with operation of the tractor brakes, and to provide the valve mechanism with means operative for cutting off direct communication through the control line under light load conditions and to provide less intense control impulses to the conversion valve in proportion to the degree of application of the tractor brakes.

A further object is to provide such an auxiliary valve which functions as a pressure control valve under light trailer load conditions to predetermine the degree of operation of the conversion valve and hence the degree of application of the trailer brakes in proportion to the application of the tractor brakes, and to provide in such a mechanism characteristics whereby normal vacuum pressures are restored in the rear end of the control line promptly upon the releasing of the tractor brake pedal.

Other objects and advantages of the invention will become apparent during the course of the following description.

In the drawing I have shown one embodiment of the invention. In this showing, the figure is a diagrammatic showing of a tractor-trailer brake system embodying the auxiliary control valve mechanism, the latter being structurally shown in central axial section.

Referring to the drawing, the numeral 10 designates a vacuum reservoir on the tractor connected by a line 11 to a conventional vacuum suspended tractor brake booster motor 12. The booster motor is connected to one end of a control line 13 leading back to the trailer. It will be apparent from the conventional operation of the mechanism described that vacuum normally is present in the control line 13 and that pressure in such line will be raised in accordance with the admission of atmospheric pressure to the booster motor 12 to operate it. The booster motor 12 has the usually high pressure master cylinder 14 connected by lines 15 to the tractor brake wheel cylinders 16.

The booster unit is of the type having a power operated plunger in a high pressure master cylinder 14 rearwardly of which fluid is supplied from a master cylinder 17 through a line 17'. The fluid thus supplied upon initial flow of fluid through the line 17' flows past the plunger in the master cylinder 14 and then operates a valve mechanism of conventional type to energize the motor 12. Since the motor 12 and associated elements are wholly conventional, they need not be specifically described. In accordance with the operation of such booster mechanism, the motor is vacuum suspended and therefore vacuum is normally present throughout the control line 13, as previously stated.

A brake pedal 18 is connected by a rod 19 to the plunger (not shown) of the master cylinder 17 to displace fluid therefrom. The brake pedal 18 is also connected as at 20 to a switch 21 biased to closed position by a spring 22 and engageable in closed position with a contact 23. The switch 21 is normally held in open position by the brake pedal when the latter is in off position. The switch 21 is connected as at 32 to a source of current 33 such as the tractor battery, the other terminal of the source being grounded as at 34.

The control line 13 has its forward end connected to the booster motor 12 and its rear end 38 connected to a conventional conversion valve 39 from which lines 40 lead to conventional air suspended and vacuum operated trailer brake actuators 41. The conversion valve is connected by a line 42 to a vacuum reservoir 43 on the trailer, in accordance with conventional practice. Also connected to the vacuum reservoir 43 is a vacuum line 44, the forward end of this line being connected to the vacuum reservoir 10. The control line 13 and line 44 extend from the tractor to the trailer through conventional connectors 45 and 46 respectively. It will be apparent that vacuum is normally present in the line 13, and in the event of the breaking-away of the trailer from the tractor, air will be admitted to the rear end of the control line 13 and into the conversion valve 39 to operate the latter and effect operation of the trailer brakes through the actuators 41.

The auxiliary valve mechanism forming the principal subject matter of the present invention is indicated as a whole by the numeral 50. This valve mechanism comprises a body 51 having chambers 52 and 53 therein divided by a wall 54 having a port 55 therethrough. The chamber 53 communicates with the line 38 and is thus connected to the conversion valve 39. The chamber 52 communicates through a passage 57 with a port 58, and a line 59 connects such port to the vacuum line 42, and accordingly vacuum is always present in the chamber 52.

The bottom of the chamber 52 is closed by a plate 62 toward one end of which is fixed an annular air cleaner 63, carrying therebelow a solenoid 64 having an armature 65 biased upwardly to the normal position shown in the drawing by a spring 66. One terminal of the solenoid is grounded as at 67 and the other terminal is connected by a wire 68 to a contact 69 engageable with a switch arm 70 movable into engagement with a dead contact or stop member 71. A wire 72 is connected at one end to the switch contact 23 and a branch wire 73 connects the wire 72 to the switch arm 70. The wire 72 is connected to a stop light 75 on the trailer, grounded as at 76.

Coaxial with the solenoid 64, the body 51 is provided with a chamber 78 adapted to communicate through a port 79 with a passage 57, the port 79 being normally closed by a valve 80 carried by a stem 81 fixed to the armature 65. The stem 81 also carries a valve 83 movable downwardly to close a port 84 opening into the interior of the air cleaner 63, the port 84 being normally open as shown.

A preferably die-cast ring member 90 is arranged above and fixed to the body 51 and secures in position with respect to such body a preferably reinforced diaphragm 91. This diaphragm separates the chamber 53 from an intermediate chamber 92 communicating through a passage 93 with the chamber 78. Whatever pressure is present in the chamber 78, therefore, always exists also in the chamber 92.

A cap member 95 is secured to the ring member 90 and secures in position with respect thereto an upper smaller diaphragm 96 forming the top of the chamber 92 and dividing such chamber from an upper chamber 97 formed in the cap 95. The chamber 97 communicates with the control line 13 as shown.

The diaphragms 91 and 96 are fixed together axially thereof by a tubular member 100 and have a spacer 101 therebetween to maintain the proper spaced relationship of the diaphragms. A stem 102 projects through the tubular member 100 and carries at its lower end a valve 103 normally closing the port 55. At its upper end, the stem 102 carries a normally open valve 104 movable downwardly to close the upper end of the passage through the tubular member 100. Both of the diaphragms are biased downwardly by a spring 105, thus normally holding such diaphragms in their lower positions in engagement with a flange 106 formed integral with the body 51 and broken only at the right side thereof as shown in the drawing so that the axial portion of the chamber 53 is always in full communication with the right hand portion of such chamber which opens to the line 38. With the diaphragm structure in its normal position, the valve 103 will be closed and the valve 104 open.

*Operation*

The parts normally occupy the positions shown in the drawing. It will be noted that the control line 13 communicates with the chamber 97 which is open to the chamber 53 through the interior of the tubular member 100, while the chamber 53 is directly open to the rear end 38 of the control line. Assuming that the trailer is heavily loaded, the switch 70 will be moved into engagement with the dead contact 71 and no circuit will be closed through the wire 68 and solenoid 64. Under such conditions, the parts of the auxiliary valve mechanism 50 will be unaffected.

If the operator depresses the brake pedal 18 under such conditions, the circuit across the contact 23 will be closed and the stop light 75 will be operated. The brake pedal will operate the master cylinder 17 to displace fluid through line 17′ to the booster motor to operate the valve mechanism thereof (not shown) to disconnect one end of the motor from the source of vacuum and connect it to the atmosphere. The motor 12 will be operated to displace fluid through lines 15 into the brake cylinders 16. The end of the motor 12 to which air is admitted will be the end to which the line 13 is connected, and accordingly air will be admitted into the line 13 and will flow through the auxiliary valve mechanism 50 in the manner described, thence through line 38 into the conversion valve 39 to operate the latter and connect the trailer brake actuators 41 to the vacuum line 42 to apply the trailer brakes. Such operation of the trailer brake actuators takes place proportionately to the actuation of the tractor brake motor 12. Such proportionate actuation represents the maximum actuation of the trailer brake actuators 41 relative to the tractor brake motor 12 for any given brake application. Thus the system is operative to supply proper braking for a loaded trailer.

Where the trailer is running light or is hauling a light load, maximum trailer brake operation provides excessive braking, and the present invention provides means for reducing the actuation of the trailer brake actuators relative to the tractor brake actuators. It will be noted that in the normal positions of the parts of the valve mechanism 50, the chamber 92 communicates with the atmosphere through passage 93, chamber 78, port 84 and air cleaner 63. Vacuum will exist in the chamber 52 through its connection with the source 43 through duct 57 and pipes 59 and 42. At the same time, vacuum will exist in chambers 97 and 53, both of such chambers in the normal positions of the parts communicating with the control line 13 in which vacuum is normally maintained. The spring 105 thus will maintain the diaphragm structure in the position shown in the drawing, the valve 104 being open and valve 103 being closed, as stated.

When the trailer is running unloaded, or lightly loaded, the operator will manually close the switch 70, moving it into engagement with the contact 69. Under such conditions, a circuit will be closed upon operation of the brake pedal 18 through the solenoid 64. Such operation of the brake pedal operates the booster motor 12 in the same manner as before and energizes the solenoid to move the armature 65 downwardly. Thus the valve 80 will be opened and the valve 83 closed to disconnect the chamber 78 from the atmosphere and open it to vacuum through the line 59. Air thereupon will be exhausted from the intermediate chamber 92.

The operation of the booster motor 12 admits air into the control line 13, thus raising pressures in the chambers 97 and 53. Due to the greater area of the diaphragm 91 relative to the diaphragm 96, the rise in pressure in the chamber 53 will cause the diaphragm structure to move upwardly against the loading of the spring 105. Such action will move the upper end of the tubular member 100 into engagement with the valve 104 when a predetermined pressure is reached in the chamber 53, in which case the valves 103 and 104 will be in lap position. The higher pressure in the chamber 53, of course, will be communicated through the line 38 to the conversion valve 39 to operate the latter and effect application of the trailer brakes. The spring 105 tends to retard the establishment of the lap position of the valves 103 and 104. This fact insures the transmission of a minimum control pressure without reduction to the conversion valve to overcome the return springs in such valve and in the trailer brakes.

Assuming that the pressure in the chamber 53 tends to rise above the desired predetermined point, there will be a slight lifting of the diaphragm 91 and since the valves 103 and 104 will be in lap position, the tubular member 100 will slightly elevate the valve 104 and transmit similar movement to the valve 103 to "crack" the port 55. Some air will then be exhausted from the chamber 53 into the chamber 52 to restore the lap positions of the valves 103 and 104 and restore the desired maximum pressure in the chamber 53. Any desired predetermined pressure may be established in the chamber 53 according to the ratio of the areas of the diaphragms 91 and 96, as will be apparent.

When the brake pedal is released, the switch 21 will be immediately opened and the booster motor 12 will be de-energized and vacuum-suspended and vacuum again will be connected to control line 13. Under such conditions, the solenoid 64 will be de-energized and the valve 80 will close while the valve 83 opens. Thus the chamber 92 will be reconnected to the atmosphere. A drop in pressure will occur in the line 13 and in the chamber 97, and since a higher pressure at this time will be present in the chamber 53 with the valve 104 closed, the diaphragm 91 will be elevated and the stem 102 will be lifted to open the valve 103, thus relieving pressure from the chamber 53 and line 38 into the chamber 52, which is always in communication with the source of vacuum 43. This effects a quick releasing of the control pressure in the line 38 to restore the normal condition of the conversion valve 39.

The drop in pressure referred to in the chamber 53, of course, relieves pressure against the bottom of the diaphragm 91, and atmospheric pressure in the chamber 92 will act downwardly with greater force against the diaphragm 91 than upwardly against the diaphragm 96 due to the difference in the areas of such diaphragms. Under such conditions, the parts of the valve mechanism 50 will be restored to normal position, and any residual pressure in the chamber 53 will then be exhausted through the tubular member 100 and chamber 97 into the control line 13, which is now in communication with the source of vacuum 10. Accordingly, all of the parts will be restored to their normal positions.

From the foregoing, it will be apparent that the present system includes a highly efficient auxiliary valve mechanism connectible in series with the control line of a vacuum operated tractor-trailer brake system to control the degree of trailer brake actuation. Such actuation is always proportionate to the operation of the booster motor 12. However, when the trailer is heavily loaded, there is direct communication between the control line 13 and the line 38, forming in effect the rear end of the control line, and the ratio of trailer brake actuation to tractor brake actuation is relatively high. Such ratio, however, is relatively low when the switch 70 is in engagement with the contact 69, when the trailer is empty or relatively lightly loaded, thus providing a lower degree of trailer brake actuation to eliminate overbraking of the trailer. As previously stated, such ratio of trailer brake actuation under light load conditions may be determined by the relative areas of the diaphragms 91 and 96.

The present system may be used in conjunction with the auxiliary valve mechanism of my copending application Serial No. 734,642, filed May 12, 1958, now Patent No. 2,985,488. Such valve mechanism is operable by a switch mechanism in conjunction with the brake pedal to provide for immediate operation of the conversion valve upon initial movement of the brake pedal, thus providing for immediate trailer brake actuation without the lag usually occurring between operation of the pedal operated control valve and the conversion valve, which causes the trailer brakes to be applied after the tractor brakes. If the auxiliary valve mechanism of the copending application is employed, it will be connected in series in the control line 13.

It is to be understood that the form of the invention shown and described is to be taken as a preferred example of the same and that various changes in the shape, size, and arrangement of the parts may be made as do not depart from the spirit of the invention or the scope of the appended claims.

I claim:

1. In a tractor-trailer brake system, a first vacuum source on the tractor, a control valve on the tractor connected to said source, a conversion valve on the trailer, trailer brake actuators connected to said conversion valve, a control line having a forward end connected to said control valve and a rear end connected to said conversion valve, a second source of vacuum on the trailer connected to said conversion valve, and a valve mechanism on the trailer connected in said control line, said valve mechanism comprising a housing, a pressure operable unit in said housing comprising a smaller diaphragm and a larger diaphragm spaced therefrom and connected thereto and defining therebetween an intermediate chamber, said smaller diaphragm defining with said casing an upper chamber communicating with the forward end of said control line, said lower diaphragm defining with said housing a lower chamber communicating with the rear end of said control line, said control line being normally connected to said first source of vacuum through said control valve and said pressure operable unit having a passage normally connecting said upper and lower chambers, a normally open valve in said upper chamber adapted to close said passage upon upward movement of said pressure operable unit, means normally connecting said intermediate chamber to the atmosphere, and means operable for connecting said intermediate chamber to said second vacuum source whereby a predetermined increase in pressure in said lower chamber moves said pressure operable unit to close said valve and close communication between said upper and lower chambers and thus limit pressure in the rear end of said control line when said control valve is operated to transmit pressure through said forward end of said control line.

2. A system according to claim 1 in which said housing is provided with a vacuum chamber communicating with said second source, and means for connecting said lower chamber to said vacuum chamber when pressures in said lower chamber increase above said predetermined point.

3. A system according to claim 1 provided with a spring in said upper chamber biasing said pressure operable unit to a normal position in which said valve is open, and means for relieving pressure from said lower chamber to said second source when pressure in said lower chamber increases above a predetermined point.

4. A system according to claim 1 provided with a spring in said upper chamber biasing said pressure operable unit to a normal position in which said valve is open, a normally closed second valve in said lower chamber controlling communication between such chamber and said second source and connected to said first-mentioned valve whereby, when said pressure operable unit is moved upwardly by pressure in said lower chamber to close said first-mentioned valve, said second valve will be opened to prevent further increase in pressure in said lower chamber.

5. A system according to claim 1 provided with a spring in said upper chamber biasing said pressure operable unit to a normal position in which said valve is open, a vacuum chamber in fixed communication with said second source, a port between said vacuum chamber and said lower chamber, and a valve in said lower chamber normally closing said port and connected to said first-named valve whereby, when said pressure operable unit moves upwardly to close said first-mentioned valve, further increase in pressure in said lower chamber will unseat said second valve to exhaust pressure from said lower chamber to said vacuum chamber.

6. In a tractor-trailer brake system, a first vacuum source on the tractor, a control valve on the tractor connected to said source, a conversion valve on the trailer, trailer brake actuators connected to said conversion valve, a control line having a forward end connected to said control valve and a rear end connected to said conversion valve, a second source of vacuum on the trailer connected to said conversion valve, and a valve mechanism on the trailer connected in said control line, said valve mechanism comprising a housing, a pressure operable unit in said housing comprising a smaller diaphragm and a larger diaphragm spaced therefrom and connected thereto and defining therebetween an intermediate chamber, said smaller diaphragm defining with said casing an upper chamber communicating with the forward end of said control line, said lower diaphragm defining with said housing a lower chamber communicating with the rear end of said control line, said control line being normally connected to said first source of vacuum through said control valve and said pressure operable unit having a passage normally connecting said upper and lower chambers, a normally open valve in said upper chamber adapted to close said passage upon upward movement of said pressure operable unit, a valve device normally connecting said intermediate chamber to the atmosphere and operable for connecting it to said second source of vacuum whereby a predetermined increase in pressure in said lower chamber moves said pressure operable unit to close said valve and close communication between said upper and lower chambers to limit pressure in said rear end of said control line when said control valve is operated to transmit pressure through said forward end of said control line, and electromagnetic means for operating said valve device.

7. A system according to claim 6 wherein said electromagnetic means comprises a solenoid carried by said valve mechanism and having an armature connected to said valve device, and a circuit for said solenoid comprising a manually operable switch on the tractor.

8. A system according to claim 7 provided with valve means adapted to relieve pressure from said lower chamber to said second source when pressure in said lower chamber increases above said predetermined point.

9. In a tractor-trailer brake system, a control valve on a tractor adapted for connection to a source of vacuum on a tractor, a conversion valve on the trailer, trailer brake actuators connected to said conversion valve, a control line connected between said control valve and said conversion valve, and a valve mechanism on the trailer connected in said control line, said valve mechanism comprising a housing having a wall forming on opposite sides a pair of chambers, a source of vacuum on the trailer to which one of said chambers is connected, the other of said chambers communicating with the rear end of said control line leading to said conversion valve whereby pressures in said other chamber determine the operation of said conversion valve for operating said trailer brake actuators, said wall having a port therethrough, a relief valve in said other chamber normally closing said port, and pressure responsive means defining with said housing a third chamber connected to the forward end of said control line and normally communicating with said other chamber whereby pressure impulses transmitted by said control valve to said control line will pass entirely therethrough to operate said conversion valve, said pressure responsive means being subject to pressure in said other chamber, said pressure responsive means being operable by pressure in said other chamber for closing said normal communication when pressure in said other chamber increases to a predetermined point, said pressure responsive means being connected to said relief valve to open it when pressure in said other chamber exceeds said predetermined point.

10. In a tractor-trailer brake system, a control valve on a tractor adapted for connection to a source of vacuum on a tractor, a conversion valve on the trailer, trailer brake actuators connected to said conversion valve, a control line connected between said control valve and said conversion valve, and a valve mechanism on the trailer connected in said control line, said valve mechanism comprising a housing having a wall forming on opposite sides a pair of chambers, a source of vacuum on the trailer to which one of said chambers is connected, the other of said chambers communicating with the rear end of said control line leading to said conversion valve whereby pressures in said other chamber determine the operation of said conversion valve for operating said trailer brake actuators, said wall having a port therethrough, a relief valve in said other chamber normally closing said port, and pressure responsive means defining with said housing a third chamber connected to the forward end of said control line and normally communicating with said other chamber whereby pressure impulses transmitted by said control valve to said control line will pass entirely therethrough to operate said conversion valve, said pressure responsive means comprising a pair of differential diaphragms forming therebetween a fourth chamber, one of said diaphragms being exposed to said pressure in said other chamber, said fourth chamber being normally connected to the atmosphere, and means operable for connecting said fourth chamber to said source of vacuum on the trailer and for disconnecting said fourth chamber from the atmosphere, whereby pressure increases in said other chamber will operate said pressure responsive means for closing said normal communication when pressure in said other chamber increases to a predetermined point, said pressure responsive means being connected to said relief valve to open it when pressure in said other chamber exceeds said predetermined point.

11. In a tractor-trailer brake system, a control valve on a tractor adapted for connection to a source of vacuum on a tractor, a conversion valve on the trailer, trailer brake actuators connected to said conversion valve, a control line connected between said control valve and said conversion valve, and a valve mechanism on the trailer connected in said control line, said valve mechanism comprising a housing having a wall forming on opposite sides a pair of chambers, a source of vacuum on the trailer to which one of said chambers is connected, the other of said chambers communicating with the rear end of said control line leading to said conversion valve whereby pressures in said other chamber determine the operation of said conversion valve for operating said trailer brake actuators, said wall having a port therethrough, a relief valve in said other chamber normally closing said port, and pressure responsive means defining with said housing a third chamber connected to the forward end of said control line and normally communicating with said other chamber whereby pressure impulses transmitted by said control valve to said control line will pass entirely therethrough to operate said conversion valve, said pressure responsive means being subject to pressure in said other chamber, whereby pressure increases in said other chamber will operate said pressure responsive means for closing said normal communication when pressure in said other chamber increases to a predetermined point, said pressure responsive means being connected to said relief valve to open it when pressure in said other chamber exceeds said predetermined point, and means comprising solenoid means having a circuit including a control switch adapted to be closed to energize said solenoid means to render pressure in said other chamber effective for operating said pressure responsive means to close said normal communication through said control line.

12. A system according to claim 11 wherein said pressure responsive means comprises a pair of differential diaphragms forming therebetween a fourth chamber, the larger of said diaphragms being exposed to pressure in said other chamber, and means normally connecting said fourth chamber to the atmosphere, said solenoid means being operable for disconnecting said fourth chamber from the atmosphere and connecting it to said source of vacuum on the trailer.

13. In a tractor-trailer brake system, a control valve on a tractor adapted for connection to a source of vacuum on a tractor, a conversion valve on the trailer, trailer brake actuators connected to said conversion valve, a control line connected between said control valve and said conversion valve, and a valve mechanism on the trailer connected in said control line, said valve mechanism comprising a housing having a wall forming on opposite sides a pair of chambers, a source of vacuum on the trailer to which one of said chambers is connected, the other of said chambers communicating with the rear end of said control line leading to said conversion valve whereby pressures in said other chamber determine the operation of said conversion valve for operating said trailer brake actuators, said wall having a port therethrough, a relief valve in said other chamber normally closing said port, and pressure responsive means defining with said housing a third chamber connected to the forward end of said control line and normally communicating with said other chamber whereby pressure impulses transmitted by said control valve to said control line will pass entirely therethrough to operate said conversion valve, said pressure responsive means comprising a pair of differential diaphragms forming therebetween a fourth chamber, one of said diaphragms being exposed to said pressure in said other chamber, an auxiliary chamber communicating with said fourth chamber, a pair of connected valves controlling communication between said auxiliary chamber and the atmosphere and said source of vacuum on the trailer and normally positioned to connect said auxiliary chamber to the atmosphere and disconnect it from said source of vacuum on the trailer, and means operable for moving said pair of valves to close said auxiliary chamber to the atmosphere and open it to said source of vacuum on the trailer to establish vacuum in said fourth chamber whereby said pressure responsive means is movable upon a predetermined increase in pressure in said other chamber to close said normal communication, said pressure responsive means being connected to said relief valve to open it when pressure in said other chamber exceeds said predetermined point.

14. A system according to claim 13 wherein said means operable for moving said pair of valves comprises a solenoid having an armature connected to said pair of valves and having a circuit including a switch adapted to be closed to energize said solenoid and move said pair of valves to close said auxiliary chamber to the atmosphere and open it to said source of vacuum on the trailer.

15. In a tractor-trailer brake system, a control valve on the tractor adapted for connection to a source of vacuum on the tractor, a conversion valve on the trailer, trailer brake actuators connected to said conversion valve, a control line connected between said control valve and said conversion valve, and a valve mechanism on the trailer connected in said control line, said valve mechanism comprising a housing, pressure responsive means in said housing dividing it to form a pair of chambers normally communicating with each other, one of said chambers communicating with said forward end of said control line, the other chamber being connected to said rear end of said control line, said one chamber being normally connected to vacuum by said control valve and being connectible to the atmosphere by operation of said control valve to increase pressure in said other chamber to operate said conversion valve to operate said trailer brake actuators, said pressure responsive means being subject to pressures in said other chamber and being operable to close said normal communication when pressure in said other chamber increases to a predetermined point incident to operation of said control valve, a source of vacuum on the trailer, and a valve device operable by said pressure responsive means to connect said other chamber to said last named source of vacuum when pressure in said one chamber decreases to a predetermined point relative to pressure in said other chamber.

16. A system according to claim 15 wherein said housing is provided with a vacuum chamber connected to said vacuum source on the trailer, said valve device comprising a normally closed valve controlling communication between said other chamber and said vacuum chamber and movable to open position by said pressure responsive means.

References Cited in the file of this patent
UNITED STATES PATENTS

| | | |
|---|---|---|
| 2,228,631 | Kuiper | Jan. 14, 1941 |
| 2,362,931 | Rodway | Nov. 14, 1944 |
| 2,370,582 | Rodway | Feb. 27, 1945 |
| 2,634,742 | Price | Apr. 14, 1953 |
| 2,857,988 | Stelzer | Oct. 28, 1958 |